(No Model.)
H. J. ANDERSON.
ORE CONCENTRATOR.
No. 414,962. Patented Nov. 12, 1889.
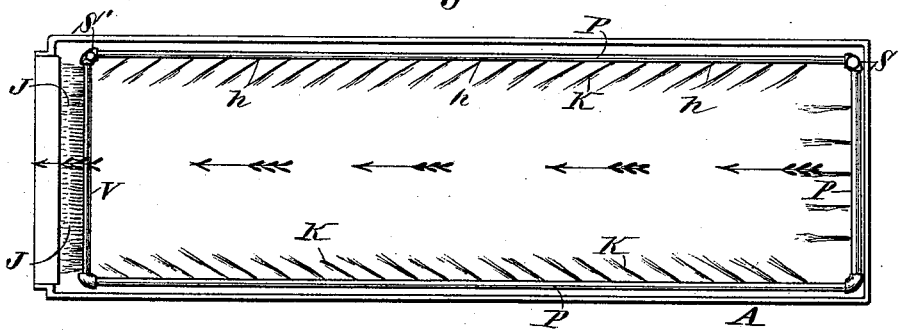
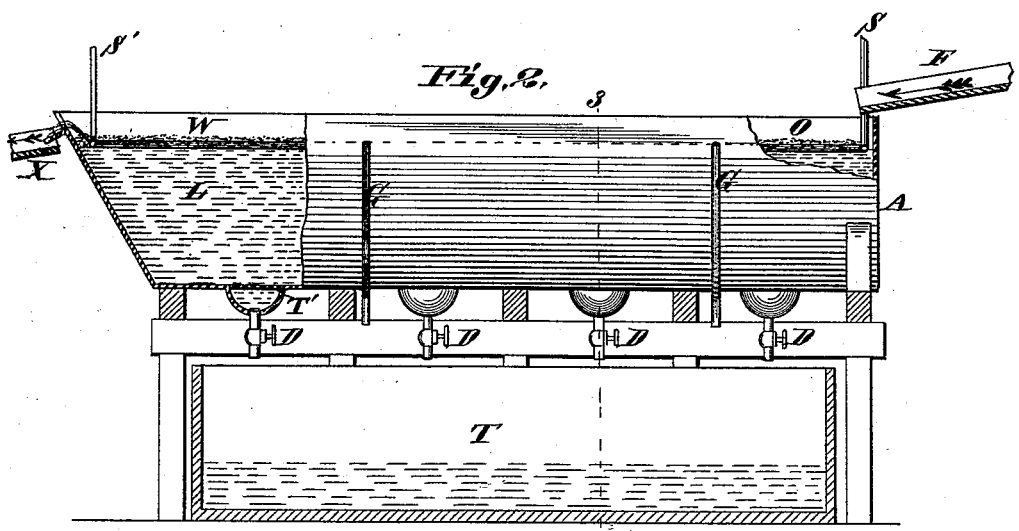
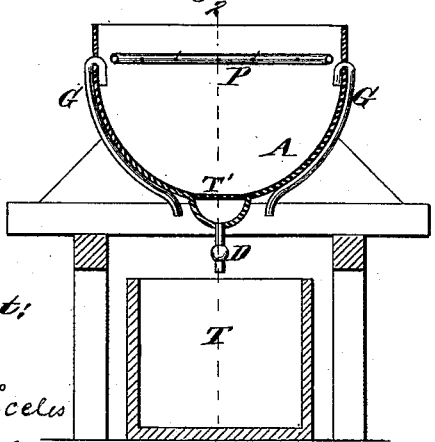
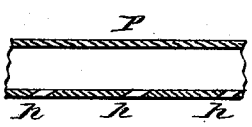
Attest:
Wm. M. Eccles
Robert L. McLaren
Inventor:
Henry J. Anderson

UNITED STATES PATENT OFFICE.

HENRY J. ANDERSON, OF ST. LOUIS, MISSOURI.

ORE-CONCENTRATOR.

SPECIFICATION forming part of Letters Patent No. 414,962, dated November 12, 1889.

Application filed February 18, 1889. Serial No. 300,346. (No model.)

*To all whom it may concern:*

Be it known that I, HENRY J. ANDERSON, a citizen of the United States, and residing in the city of St. Louis, in the State of Missouri, have invented a new and useful Improvement in Ore-Concentrators, of which the following is a specification.

My invention consists in the arrangement and combination of parts herein described and claimed.

My objects are to secure a perfect separation of the precious metals from the refuse ores by passing the crushed ores over a liquid the specific gravity of which is greater than the refuse ores and less than the precious metals in such a manner that the ore will not bank and clog, but so that the precious metals will be separated from the refuse ore as it passes over the liquid and sink to the bottom of the liquid, and the refuse ore will be passed along continually and discharged at the tail of the concentrator, and also to throw the refuse ore over the tail of the machine continually and uniformly, so as to prevent banking and accumulation at that point. I attain these objects by the mechanism illustrated in the accompanying drawings, in which—

Figure 1 is a top view of my invention. Fig. 2 is a side elevation of the same, with part in section on line 2 2, Fig. 3. Fig. 3 is a cross-section on line 3 3, Figs. 1 and 2. Fig. 4 is a longitudinal section of one of the pipes P.

A in the drawings is a long trough of any desired shape made liquid-tight. It is provided along the bottom with one or more drain-cocks D D D, which communicate downward with a large tank T, which cocks are provided with screens T' at their mouths to retain the precious metals and allow the liquid to pass out of the drain-cocks, and which screens are designated by the letter T'. The drain-cocks serve to draw the separating-liquid out of the trough A when the operator desires to clean up and take the precious metals out.

T is a large tank situated under the trough A, and serves to receive and retain the separating-liquid when it is drawn out of the trough A. The trough A is also provided with overflow-pipes G, which rise from the tank T up the outside of the trough to a level with the top of the separating-liquid in the trough, then pass through the side of the trough and bend down and enter into the separating-fluid on the inside of the trough sufficiently far to prevent the water from getting into them. These overflow-pipes serve to drain the surplus separating-liquid off and to keep it at a certain level, and always at the same certain level, when, by reason of the accumulation of precious metals at the bottom of the trough, the separating-liquid is caused to rise in the trough.

The function of that portion of the pipe G which is situated inside the trough is to prevent the water from passing out through the pipe G and not to cause it to operate as a siphon, and the function of that portion which is outside of the trough is simply to direct the surplus separating-liquid into the tank below, and the pipes are never full of separating-liquid or any considerable portion of them full; but the liquid passes out in small quantities as the accumulation of precious metals occurs, and no faster, their function being solely to keep the separating-liquid at a certain level all the time, and also by passing down into the separating-liquid on the inside of the trough to prevent the water from running out through the holes in the side of the trough or rising in the pipes and passing out into the tank T. The inside end of the pipe G may extend down into the liquid farther than the end which is outside of the trough goes toward the tank and to a lower plane. I do not use the outside end of the pipe G for any purpose except to direct the separating-liquid into the tank T, and for that reason it may be shorter than the inside end or may be dispensed with altogether, if desired, and only that portion used which is inside the trough A.

The liquid as it rises by the accumulation of precious metals at the bottom of the trough A runs through the pipe G and drops down from the short or outer end of said pipe into the tank T, when the outer end of the pipe G is dispensed with.

P P is a water-pipe situated on the inside of the trough close to the sides and ends and near the top of the trough. This pipe P has an internal connection along both sides and at the front end, but no internal connection with the back or tail end pipe. The pipes on the sides of the trough are each provided with a series of oblique holes $h$ opening inward, and so constructed and arranged that when water is forced into the pipes and through the oblique holes $h$ under pressure they will give the water-jets an oblique direction inward and toward the rear of the trough and in a plane a little above the surface of the separating-liquid in the trough A, so as to move the ore and water inward and toward the rear end of the trough and not allow it to bank on the sides. The front part of the pipe is provided with straight holes throwing jets in the same plane as the oblique holes and serving to give the ore an impetus toward the rear of the trough, and likewise prevent it from banking where it comes out of the flume F. These pipes are provided with a supply-pipe S, which admits water under pressure to the pipes P P.

At the rear of the trough is a cross-pipe V, which is provided with a longitudinal slot the whole length of the same, which is so set as to direct a sheet of water forced through it in an upward and outward direction, which will carry the refuse ore with it over the tail of the trough and not let it bank at that point. This pipe V is provided with a supply-pipe S', which also admits water under pressure, and which pressure may be different in intensity from that admitted through the pipe S.

F is a flume or inlet through which the crushed ore and water are admitted into the trough A and into the separating-liquid. L is a separating-liquid, which has a specific gravity greater than the refuse ore and less than the precious metals, and which will for that reason, therefore, allow the precious metals to sink down through it to the bottom of the trough, while at the same time it will float the refuse ore, and by the action of the water pass it off at the tail of the trough. This liquid may be any kind which has these properties. The liquid which I preferably use, however, is carbon bisulphide. This separating-liquid is filled into the trough A until it begins to discharge through the pipes G, or until it rises close to the pipes P and V, and then the trough is ready for use.

The trough is mounted on suitable framework to support the same, and is situated above the tank T.

To operate my invention, fill the trough A with the separating-liquid, as described, turn water on through pipes S S' under proper pressure, open the flume F, and let the crushed ore and water run in, and it will rush in on top of the separating-liquid L and be caught by the water-jets from the front-end pipe, which will give it an impetus forward, and as it is started on its course toward the tail of the trough it will be caught on the sides by the oblique jets of water K K and moved on and kept away from the sides and from banking until it reaches the upward sheet of water J, when it is caught by it and thrown out over the tail of the trough. Thus the ore is kept spread out over the surface of the separating-liquid and agitated and moved onward from the time it enters the trough until it is thrown over the tail of the trough and every particle of precious metal has been precipitated through the separating-liquid and separated from the ore and deposited at the bottom of the liquid in the trough.

Now, what I claim, and for which I ask Letters Patent of the United States to be granted to me, is—

1. An ore-concentrator consisting of a trough filled to a certain line with a separating-liquid herein described, an inlet-pipe, a flume, a slotted tail-end pipe, a longitudinal perforated pipe, and an overflow-pipe, all combined and operating substantially as described, and for the purposes set forth.

2. In an ore-concentrator, a pipe provided with a longitudinal slot situated at the rear of the trough of the concentrator and provided with an inlet-pipe, in combination with the main trough A, as and for the purposes set forth.

3. In an ore-concentrator, a pipe provided with a series of oblique holes, and an inlet-pipe for the admission and discharge of water, respectively, situated longitudinally along the inner edge of the trough A, in combination with said trough A and an inlet-flume F, as and for the purposes set forth.

HENRY J. ANDERSON.

Attest:
WM. M. ECCLES,
ROBT. L. MCLARAN.